United States Patent

Marschall

[11] Patent Number: 5,797,354
[45] Date of Patent: Aug. 25, 1998

[54] COLLAR FOR MOUNTING AROUND THE NECK OF AN ANIMAL

[75] Inventor: Peter Hoegh Marschall, Faaborg, Denmark

[73] Assignee: Jorgen Kruuse A/S, Marslev, Denmark

[21] Appl. No.: 700,478

[22] PCT Filed: Feb. 27, 1995

[86] PCT No.: PCT/DK95/00086

§ 371 Date: Oct. 24, 1996

§ 102(e) Date: Oct. 24, 1996

[87] PCT Pub. No.: WO95/22891

PCT Pub. Date: Aug. 31, 1995

[30] Foreign Application Priority Data

Feb. 28, 1994 [DK] Denmark .................. 0238/94

[51] Int. Cl.⁶ .................................................. A01K 15/04
[52] U.S. Cl. .................................................. 119/815
[58] Field of Search .................. 119/814–819; 128/870, 873, 874, 875, 876, 877, 878, 879; 602/17, 18

[56] References Cited

U.S. PATENT DOCUMENTS 3,036,554  5/1962  Johnson .
3,072,098  1/1963  Boemie .
5,012,764  5/1991  Fick et al. .
5,349,927  9/1994  Campbell .
5,469,814  11/1995  Moy et al. ............................ 119/815

FOREIGN PATENT DOCUMENTS 2630297  10/1989  France .
41 00 851  7/1991  Germany .
432015   9/1967  Switzerland .

Primary Examiner—Thomas Price
Attorney, Agent, or Firm—Merchant, Gould, Smith, Edell, Welter & Schmidt, P.A.

[57] ABSTRACT

At its edges for assembly, the collar has protruding tongues (14) on a rib (16), and a wide central part (17) and an outer end (18). When the collar is to be assembled, each tongue (14) is passed through a C-shaped first slot (30), and the rib (16) of the tongue is placed in the bottom of the C-shaped first slot (30), and the outer end (18) of the tongue is snapped through the C-shaped second slot (40), which does not allow the wider central part (17) of the tongue to pass. The tongues (14) are hereby locked in an associated pair of a first slot (30) and a second slot (40).

4 Claims, 2 Drawing Sheets

5,797,354

COLLAR FOR MOUNTING AROUND THE NECK OF AN ANIMAL

FIELD OF THE INVENTION

The invention concerns a collar for mounting around the neck of an animal and of the type which comprises a web of flexible material having a protruding tongue and a through slot through which the tongue may be passed when the collar is mounted around the neck of the animal.

BACKGROUND OF THE INVENTION

Such collars are mainly used for pets or domesticated animals, such as dogs and cats, but also for rodents (e.g. guinea pigs) and for birds, but may also be used for domestic animals in general. A collar of the present type is placed around the neck of an animals, e.g. a dog, where it is desired that the dog shall be prevented from licking or biting a lesion or a wound on its body or legs, since the dog might bite a bandage and tear it off or lick a wound clean of ointment with which the wound has been treated. A collar of the present type placed around the neck of an animal ensures that the animal cannot contact the place concerned on the body with its mouth and cause further injury by protracting the healing of a wound, or that an ointment on the wound cannot be licked off and cause injury in the mouth or digestive system of the dog.

Collars of the present type are typically made of a strong, plastics material in the form of a sheet, a web or a film in a thickness of 1 mm or less. Typically, the collars have the shape of a circular ring or circular ring sector, said collar being assembled around the neck of the animal by joining along two radially extending edges of the circular ring sector, thereby imparting to the collar the shape of a truncated cone shell or a funnel whose edge, which is defined by the small circle of the truncated cone, engages the neck of the animal and is optionally attached to a band around the neck of the animal while the head of the animal is present in the funnel with the "face" directed toward the opening the funnel, which is defined by the great circle of the truncated cone shell. The opening angle of the truncated cone shell may be large or small and be adapted to the animal species concerned, and for some animal species, such as e.g. cage birds, collars having a very large opening angle may be used, and here the collars may even have the approximate shape of a flat circular ring disc when placed around the neck of the cage bird.

FR 2 630 297 discloses a collar having a first tongue for passing through a straight slot in the collar. A second tongue directed in the opposite direction of the first tongue and integral therewith forms a hook adapted to be passed through a second slot and thereby lock the collar in its assembled state.

U.S. Pat. No. 3 036 554 shows such a collar which, when placed around the neck of a dog, is assembled by means of laces or staples. It is difficult and time-consuming to fit the laces or staples when assembling the collar, and to remove them when the collar is to be removed.

U.S. Pat. No. 3 072 098 concerns a collar for a chinchilla. This collar is assembled by means of loose parts in the form of a strip having two U-bends which are attached to the collar by means of two staples.

U.S. Pat. No. 5 012 764 describes a collar which is assembled by means of complementary fasteners, e.g. in the form of loops and hooks which are fastened to the overlapping ends of the collar.

DE 4 100 851 concerns a collar whose overlapping ends are assembled by means of snap fasteners.

SUMMARY OF THE INVENTION

All these known collars for animals are assembled by means of loose parts, or parts which have to be applied to the collar in the manufacture.

A collar as defined in claim 1 may be made of the base material merely by punching, and the tongues and slots of the collar constitute a complete closing mechanism, thereby obviating the necessity of applying further means which are to provide a closing mechanism.

Insertion of the tongue into two slots provides a relatively rigid assembly, and the stated structure of the tongue and of the first slot and the second slot ensures that the tongue is locked when it is placed in both slots. Suitable mutual positioning of the first slot and the second slot permits the tongue, when placed in the first slot, to be clicked or snapped into position in the second slot by just a modest deformation of the material.

The collar may be provided with two or more tongues with associated pairs of slots, which results in greater stability, in particular in case of large collars. Further, the collar may have two or more pairs of slots for each tongue, so that the collar may be made larger or smaller and thereby be adapted to animals in various sizes.

BRIEF DESCRIPTION OF THE DRAWINGS

The invention will be described more fully below with reference to the drawing, in which.

DETAILED DESCRIPTION OF THE PREFERRED EMBODIMENT

In the shown preferred embodiment the collar of the invention consists of a flexible plastics material, such as HDPE or PP having a thickness of about 0.8 mm. The collar in FIG. 1 has the shape of a circular ring sector with an angular extent of about 180°. The outer periphery 10 of the collar is a continuous circular arc, and four flaps or tongues 12 having through openings by means of which the collar is secured to e.g. a band around the neck of a dog, are provided at the inner periphery 11 of the collar.

Figure 2:
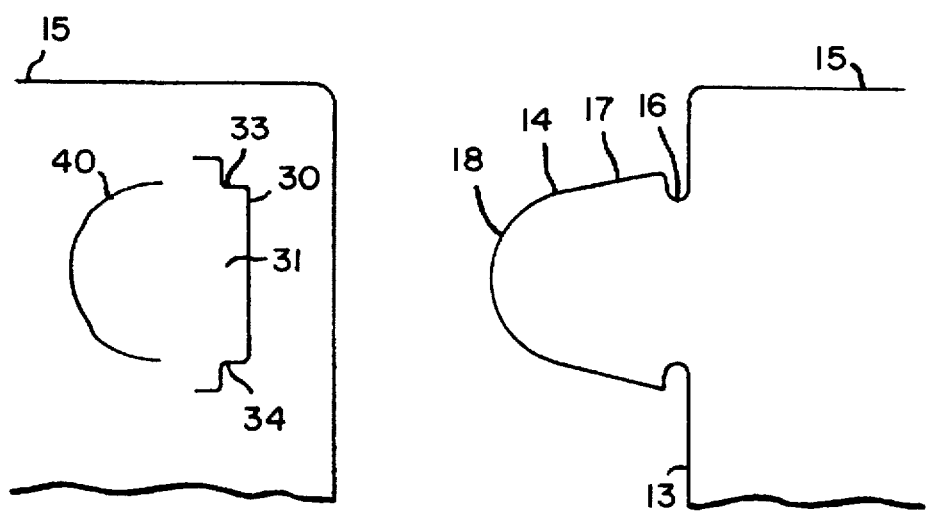
FIG. 2 shows a tongue and associated pair of slots on the collar of FIG. 1.

The collar has three uniform protruding tongues 14, which are shown on an enlarged scale in FIG. 2, along a radius 13 which defines the circular ring sector.

It will be seen from FIG. 2 that the tongue 14 is contiguous with the rest of the collar, which constitutes a web 15, by means of a rib 16 which constitutes a transition between the web 15 and the tongue 14. The rib 16 constitutes the inner end of the tongue, and immediately outside the rib 16 the rib 14 has a central part 17 which is wider than the rib 16. The central part 17 of the tongue is the part of the tongue that has straight edges in FIG. 2, which converge toward the outer tongue end 18 which is defined by a circular arc.

FIG. 2 also shows that the collar has a first slot 30 and a second slot 40. These are through slots and are cut or punched without removal of material in the embodiment shown. The first slot 30 has a bent shape which resembles a C, and has a length measured as the distance between the ends of its branches which is greater than the width of the central part 17 of the tongue 14. Owing to its C-shape the first slot 30 defines a short tongue 31, and the tongue 31 may be tilted by deformation of the material such that the first slot 30 opens so much as to enable the entire tongue 14 to be passed through the first slot 30. The slot 30 has a straight central part 32 which is defined by branches 33 and 34 forming an angle with the central part 32. The distance between the branches 33 and 34 is greater than the width of the rib 16 and smaller than the greatest width of the central part 17, and when the tongue 14 has been passed through the first slot 30, the rib 16 may therefore be present in the area of the first slot 30 near its straight central part 32, while in this position the central part 17 of the tongue, which is wider than the distance between the branches 33 and 34, cannot get through the first slot 30.

When the collar is assembled, the first slot 30 is opened and the tongue is passed completely through the slot 30, following which the rib 16 of the tongue is pulled back so that the rib is present at the straight central part 32 of the slot. Then the tongue 14 is tilted so that its outer end 18 approaches the second slot 40. The second slot 40 has a curved C-shape, which corresponds to, but is not identical with the outer end 18 of the tongue. It is noted in particular that the second slot 40 has an opening length measured as the distance between its free ends which permits the outer end 18 of the tongue to be passed through the slot 40, and that the opening length of the slot 40 is not large enough to permit the wide central part 17 of the tongue to pass through the slot 40. With the tongue 14 passed through the first slot 30 and with the rib 16 retracted to the central part 32, the outer end 18 of the tongue may be snapped or clicked through the second slot 40 by deformation.

Figure 1:
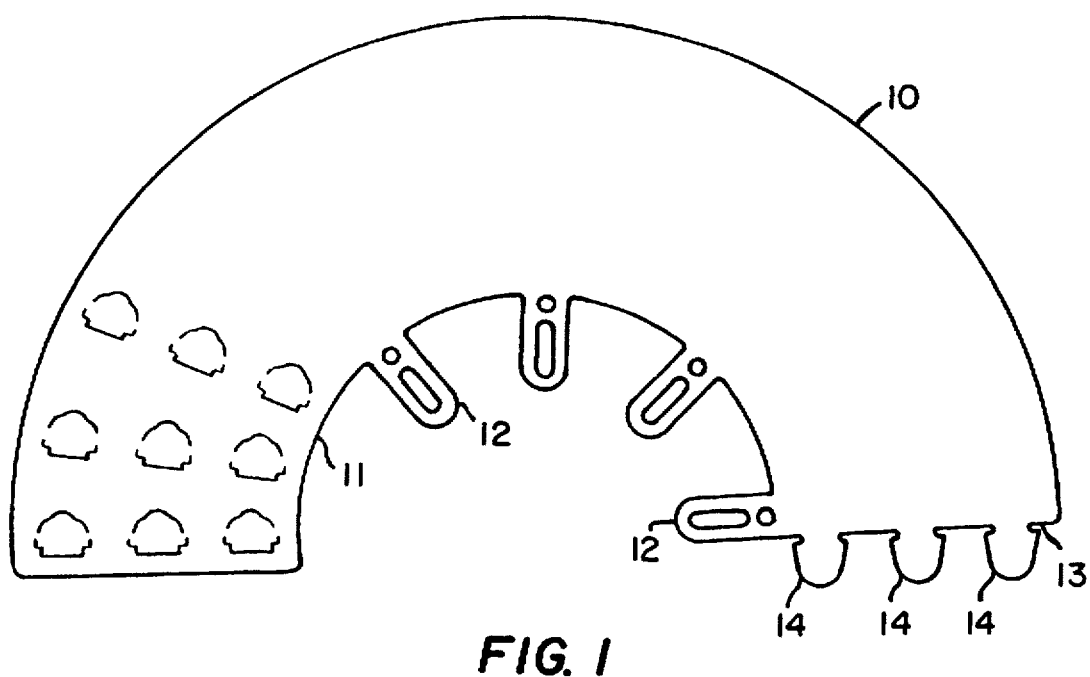
FIG. 1 shows a preferred embodiment of a collar according to the invention.
Figure 3:
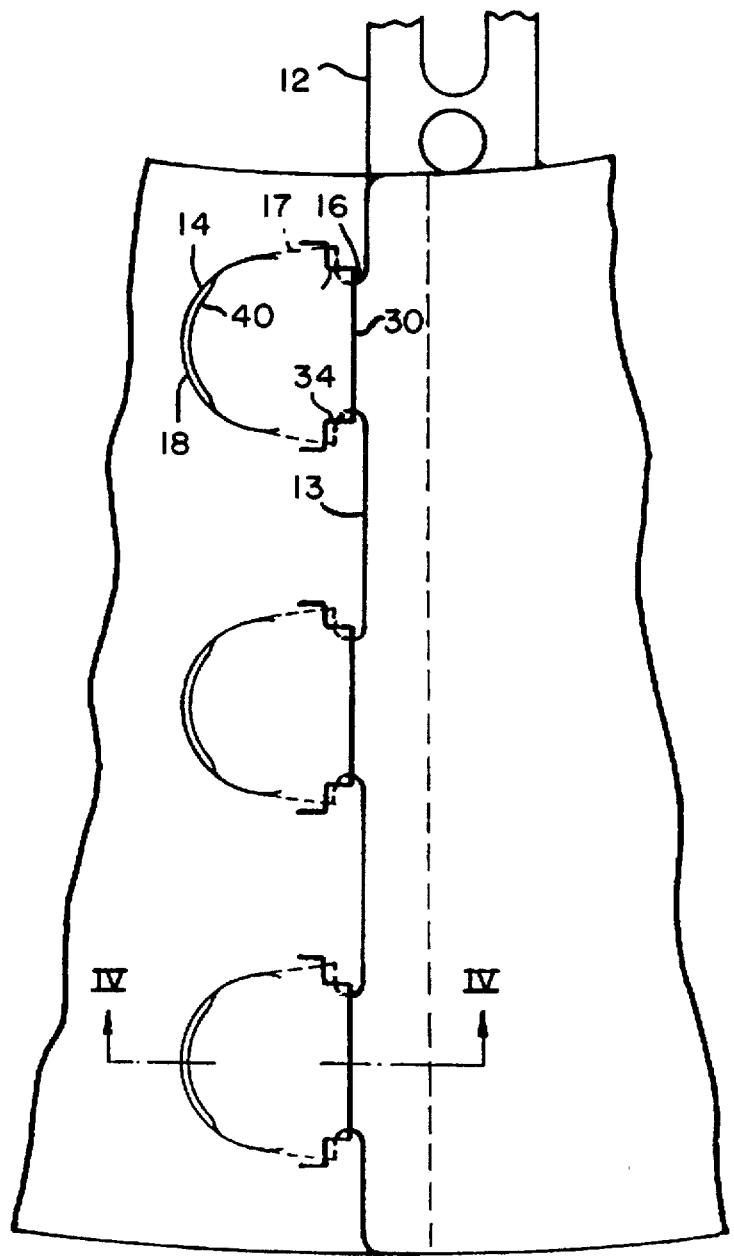
FIG. 3 shows a section of the collar of FIG. 1 in the assembled state.
Figure 4:
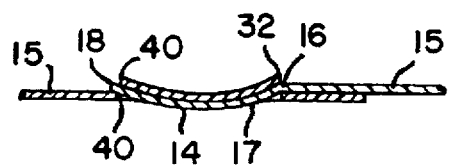
FIG. 4 shows a section of the assembled collar along the line IV—IV in FIG. 3.

FIG. 3 shows the collar of FIG. 1 in the assembled state, with its three tongues 14 passed through respective first slots 30 and second slots 40. The wide central part 17 of each tongue 14 is present behind the branches 33 and 34 of the first slot 30 in FIG. 3, so that the tongues cannot be pulled out of the first slots 30. It will moreover be seen that the outer ends 18 of each tongue 14 protrude slightly through the respective second slots 40 in close contact with the edges thereof so that the tongues 14 cannot be passed further through the second slots 40, or at any rate not so much as will enable the wide central parts 17 of the tongues 14 to get clear of the branches 33 and 34 of the first slots 30. The tongues 14 are thus completely locked in their respective pairs of associated first slot 30 and second slot 40.

The slots 30 and 40 are here shown as narrow slots which are produced without removal of material, but the invention is not restricted to this, other shapes of slots being possible, e.g. where part of the short tongues which are formed by the C-shaped slots, are removed so that the slots define openings having a finite opening area. To achieve the function mentioned here it is essential that the tongues have a rib of shorter width than the central part of the tongues, and that the first slots are in the shape of a C or a variant thereof, and it is likewise important that the second slots permit only the outer ends of the tongues, but not their central parts, to be passed through the second slots.

It will be seen from FIG. 1 that the collar has three radial rows of associated pairs of first and second slots so that the size of the assembled collar may be varied.

What is claimed is:

1. A collar for mounting around the neck of an animal, the collar comprising:

web of a flexible material;

a protruding tongue contiguous with the web;

a first through slot through which the tongue is passed when the collar is mounted around the neck of the animal, the first slot having a length permitting the entire tongue to be passed through the first slot;

a second through slot spaced from the first slot by a distance less than the length of the tongue;

the tongue being contiguous with the web being a rib having a specific width, the tongue having a central part of a width greater than the width of the rib and an outer end of a width smaller than the width of the central part;

the first slot having portions at opposed ends thereof, said opposed portions being angled towards the second slot and having a distance between them which is greater than the width of the rib and smaller than the width of the central part; and the spacing of the first and second slots and the length of the tongue being such that when the rib is present in the first slot, and the central part of the tongue has its inner end adjacent the opposed angled portions, the outer end of the tongue can be positioned in the second slot.

2. A collar according to claim 1, further comprising at least one additional protruding tongue, each of the protruding tongue and the one additional protruding tongue has an associated pair of first and second slots.

3. A collar according to claim 2, further comprising at least one additional pair of first and second slots associated with each tongue.

4. A collar for mounting around the neck of an animal, the collar comprising:

a web of a flexible material;

a protruding tongue contiguous with the web;

a first through slot through which the tongue is passed when the collar is mounted around the neck of the animal, the first slot having a length permitting the entire tongue to be passed through the first slot;

a second slot spaced from the first slot by a distance less than the length of the tongue;

the tongue being contiguous with the web being a rib having a specific width, the tongue having a central part of a width greater than the width of the rib; and the tongue and the first slot and the second slot being adapted to interact in such a manner that one of the slots restrict mutual movement of the tongue and the slots in a first direction, and that the other of the slots restrict mutual movement of the tongue and the slots in a second direction opposite the first direction.

* * * * *